Sept. 23, 1924.

T. SIMON 1,509,786

POTATO DIGGER AND VINE CUTTER

Filed Sept. 20, 1923    2 Sheets—Sheet 2

Witnesses:

Inventor
Thomas Simon
By Clarence O'Brien
Attorney

Patented Sept. 23, 1924.

1,509,786

UNITED STATES PATENT OFFICE.

THOMAS SIMON, OF MULLICA HILL, NEW JERSEY.

POTATO DIGGER AND VINE CUTTER.

Application filed September 20, 1923. Serial No. 663,742.

*To all whom it may concern:*

Be it known that I, THOMAS SIMON, citizen of the United States, residing at Mullica Hill, in the county of Gloucester and State of New Jersey, have invented certain new and useful Improvements in Potato Diggers and Vine Cutters, of which the following is a specification.

This invention relates to certain new and useful improvements in potato digging plows and vine cutters, and has particular reference to the provision of a plow by means of which potatoes may be readily harvested or by means of which vines growing about the plant may be cut or destroyed.

The primary object of the invention is to provide a device of the above kind, which embraces the desired qualities of simplicity and durability of construction as well as efficiency in operation.

A further object of the invention is to provide a vine cutting attachment for plows by means of which the vines may be efficiently cut during the operation of the plow.

Still another object of the invention is to provide means for efficiently lifting the vines to a position whereby the same may be efficiently cut by the vine cutting disc, and by means of which the vine raising means may be elevated to a higher position for rendering the same inoperative when passing from one row to the other.

Other objects will appear as the nature of the invention is better understood, and the same consists in the novel form, combination and arrangement of parts hereinafter more fully described, shown in the accompanying drawings, and claimed.

In the drawings, wherein like reference characters indicate corresponding parts throughout the several views.

Figure 1:
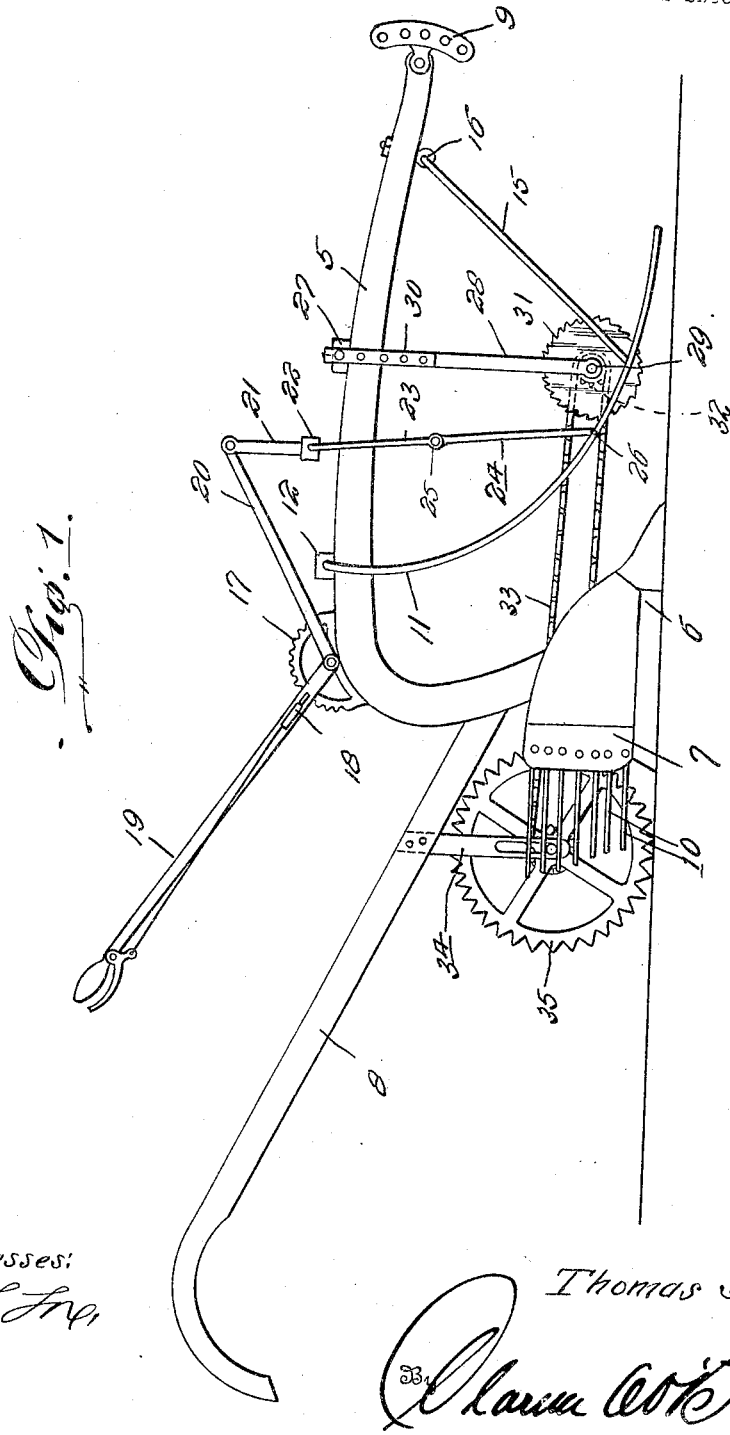
Figure 1 is a side elevational view of a combined potato digging plow and vine cutter constructed in accordance with the present invention.

Referring more in detail to the drawings, 5 indicates the beam of an ordinary plow, which carries a plow share 6 having a mold board 7, the plow being provided with the usual handles 8 by means of which the same is guided when the plow is drawn by means of horses and the like coupled to the clevis 9 provided on the forward end of the beam 5.

Rigidly attached to the rear end of the mold board 7 are a plurality of horizontal parallel rods 10 that are arranged in spaced relation and over which the potatoes and dirt pass when plowed up, the dirt passing between the rods 10 so that the latter act as a sifter for separating the potatoes from the dirt.

In accordance with the present invention, a substantially U-shaped vine lifting member is provided as indicated generally at 11 and this member is disposed with its central portion pivotally mounted in a bearing member 12 that rests upon the upper edge of the beam 5 directly in front of the plow share 6 as shown clearly in Figure 1. The parallel arms of the member 11 are curved forwardly and downwardly and their free end portions are return bent as at 13 to provide vine engaging tongues of relatively durable construction.

Figure 2:
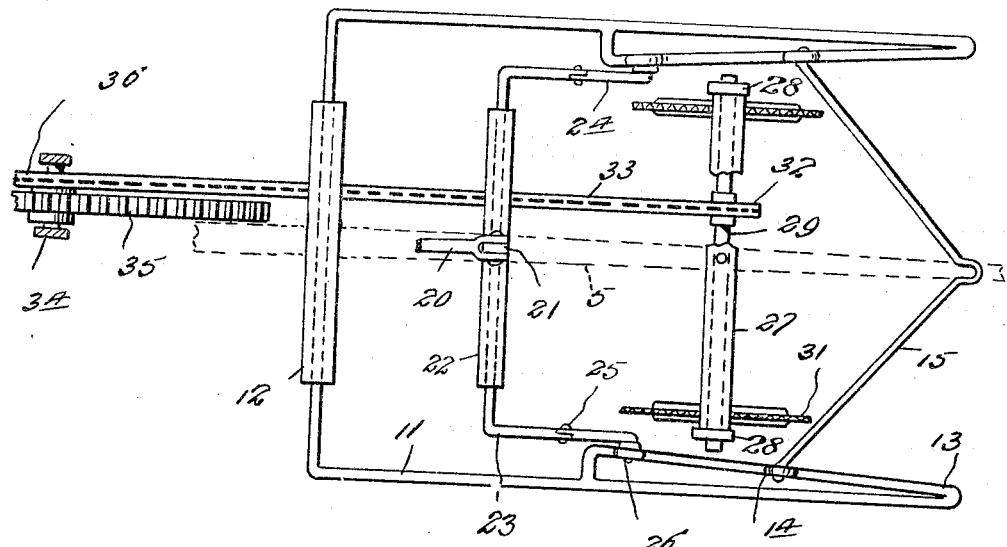
Figure 2 is an enlarged top plan view of the device shown in Figure 1 with parts removed and broken away.
Figure 3:
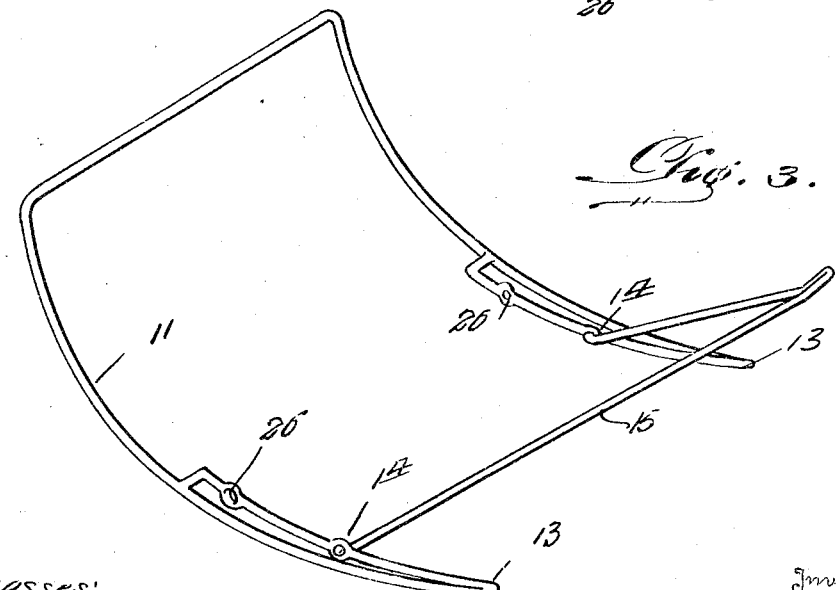
Figure 3 is an enlarged perspective view of the vine raising member and its suspending bail.

The forward ends of the arms of the member 11 are provided with eyes as at 14 in which are journalled the outturned lower ends of a bail 15 that is pivoted at its upper end as at 16 to the forward end of the plow beam 5, said bail 15 being formed with downwardly diverging arms as clearly shown in Figure 2.

Fixed upon the rear end of the plow beam 5 rearwardly of the bearing 12 is a rack segment 17, which cooperates with a catch 18 of a hand lever 19 that is pivoted to said segment 17, and extending from the pivoted end of the lever 19 is a rigid arm 20 which has its forward end flexibly connected to the arms of the member 11 by means of a link 21 that is rigid with a bearing 22, and a U-shaped bail 23 that is pivoted in the bearing 22 and has its arms respectively connected to links 24 that are pivoted to the arms of the bail 23 and to the arms of the member 11 at 25 and 26 respectively. Fixed upon the beam 5 directly behind the bail 15 is a transverse bracket 27 to the ends of which are connected vertical bearing arms 28, in the lower ends of which are journalled the ends of a transverse shaft 29. The connecting of the bearing arms 28 with the bracket 27 is adjustable as generally indicated at 30 whereby the arms may be raised or lowered to the desired distance above the ground for securing most efficient results in the cutting of the vines as will presently become apparent.

Secured upon the opposite end portions of the shaft 29 at the inner sides of the vine lifting prongs of the member 11, are two discs 31 and between said discs is arranged a sprocket wheel 32 that is secured upon the shaft 29 and around which passes an endless sprocket chain 33. The handles 8 are provided with depending bearing arms 34 rearwardly of the plow share, and a toothed ground engaging wheel 35 is suitably journalled between and in the lower ends of said arms 34 as clearly shown in Figures 1 and 2. In fixed relation to the ground engaging wheel 35 is a sprocket wheel, as at 36, around which the endless chain 33 also passes and it is thus apparent that upon forward movement of the plow, the ground engaging wheel 35 will be positively rotated, and this rotation will be transmitted to the vine cutting disc 31 through the gearing described.

In operation, the catch 18 is released and the hand lever 19 swung upwardly for lowering the member 11 so that its prongs will be in close proximity to the ground. After the bearing arms 28 have been adjusted to the desired position for locating the vine cutting disc 31 at the required elevation, the plow is drawn forwardly and the prongs of the member 11 will ride under the vines for lifting the same into position to be efficiently cut by the discs 31, said discs being rotated by operation of the ground wheel 35 and gearing therefrom as above mentioned. When moving from one row to the other, the hand lever 19 is swung downwardly so as to raise the member 11 for lifting its prongs clear of the vine, after which the member 11 is again lowered for repeating the above operation. Upon the forward movement of the plow, the potatoes will be dug by the share 6 and the dirt efficiently sifted therefrom between the bars 10.

It will thus be seen that I have provided a very simple, durable and efficient form of combined potato digging plow and vine cutter which will meet with the requirements for a successful commercial use.

Minor changes may be made without departing from the spirit and scope of the invention as claimed.

What I claim as new is:

1. In combination with a plow including a beam having a plow share, a substantially U-shaped vine lifting member having its intermediate portion extending transversely of and resting upon the rear portion of the beam, said vine lifting member having its legs depending and curved forwardly and downwardly, a bail pivoted to the forward portions of the legs of said vine lifting member and having its upper end pivoted to the forward end of the beam, and manually operable means attached to the legs of said vine lifting member for raising the latter or permitting lowering of the same.

2. In combination with a plow including a beam having a plow share, a substantially U-shaped vine lifting member having its intermediate portion extending transversely of and resting upon the rear portion of the beam, said vine lifting member having its legs depending and curved forwardly and downwardly, a bail pivoted to the forward portions of the legs of said vine lifting member and having its upper end pivoted to the forward end of the beam, and manually operable means attached to the legs of said vine lifting member for raising the latter or permitting lowering of the same, said vine lifting member having its legs return bent, vine cutting discs arranged at the inner sides of the legs of said vine lifting member, a ground engaging wheel carried by the plow rearwardly of the share, and operative connections between said vine cutting discs and said ground engaging wheel.

3. In combination with a plow including a beam having a plow share, a substantially U-shaped vine lifting member having its intermediate portion extending transversely of and resting upon the rear portion of the beam, said vine lifting member having its legs depending and curved forwardly and downwardly, a bail pivoted to the forward portions of the legs of said vine lifting member and having its upper end pivoted to the forward end of the beam, and manually operable means attached to the legs of said vine lifting member for raising the latter or permitting lowering of the same, said vine lifting member having its legs return bent, vine cutting discs arranged at the inner sides of the legs of said vine lifting member, a ground engaging wheel carried by the plow rearwardly of the share, and operative connections between said vine cutting discs and said ground engaging wheel, and means for adjusting said vine cutting discs vertically.

In testimony whereof I affix my signature.

THOMAS SIMON.